May 28, 1957 R. G. RUSSELL 2,794,058
GLASS FURNACE
Filed Aug. 13, 1952 4 Sheets-Sheet 1
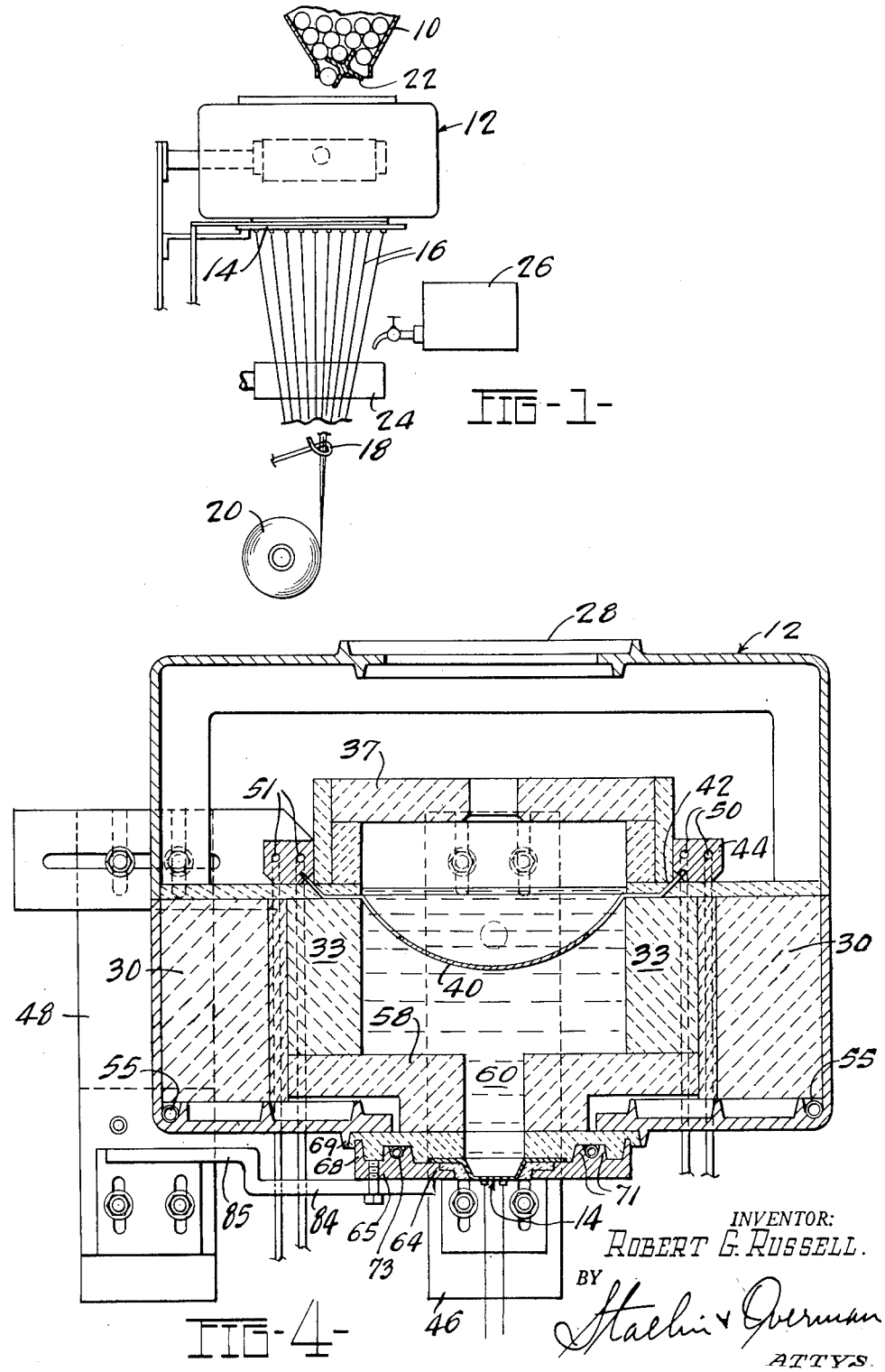

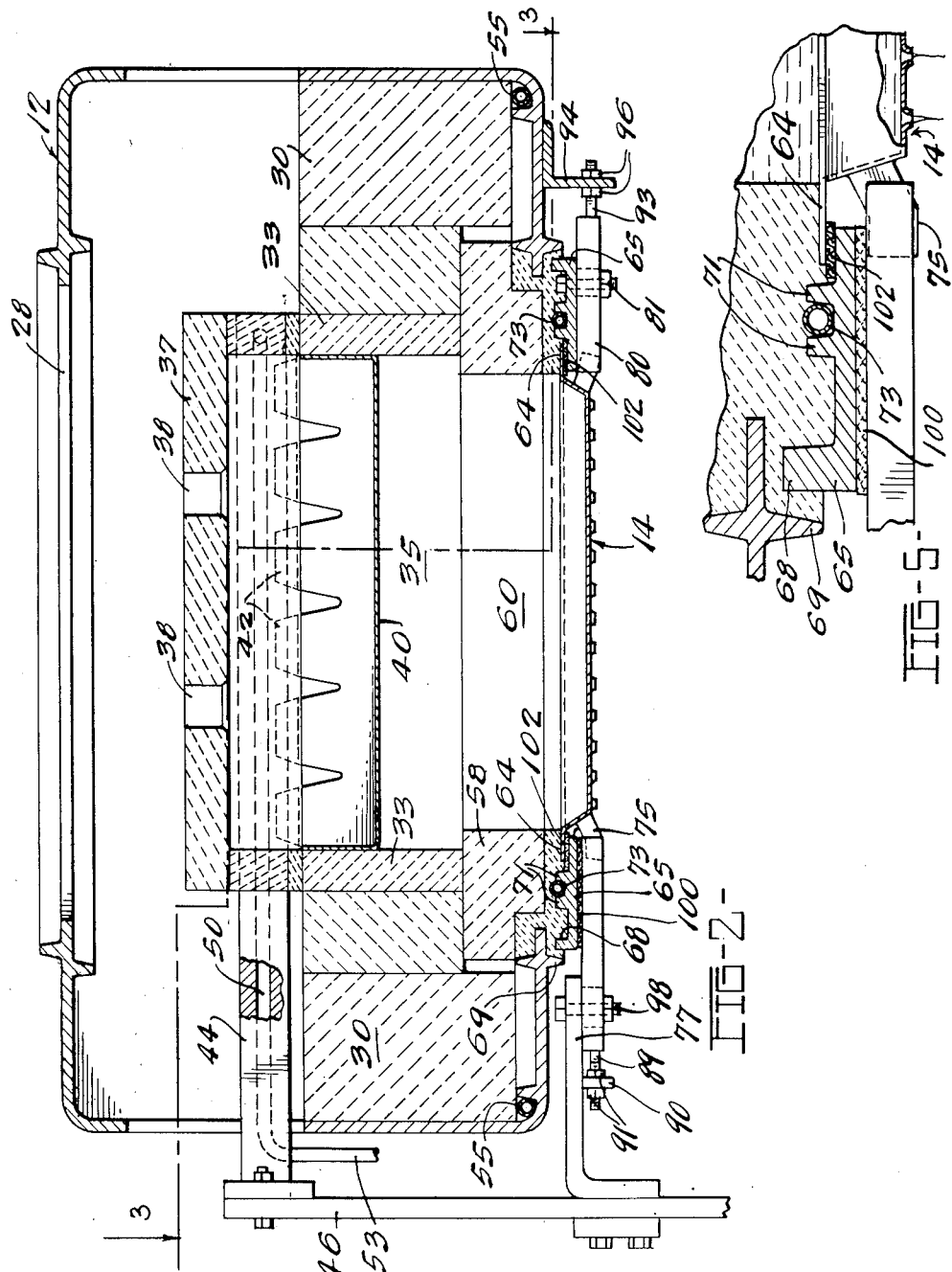

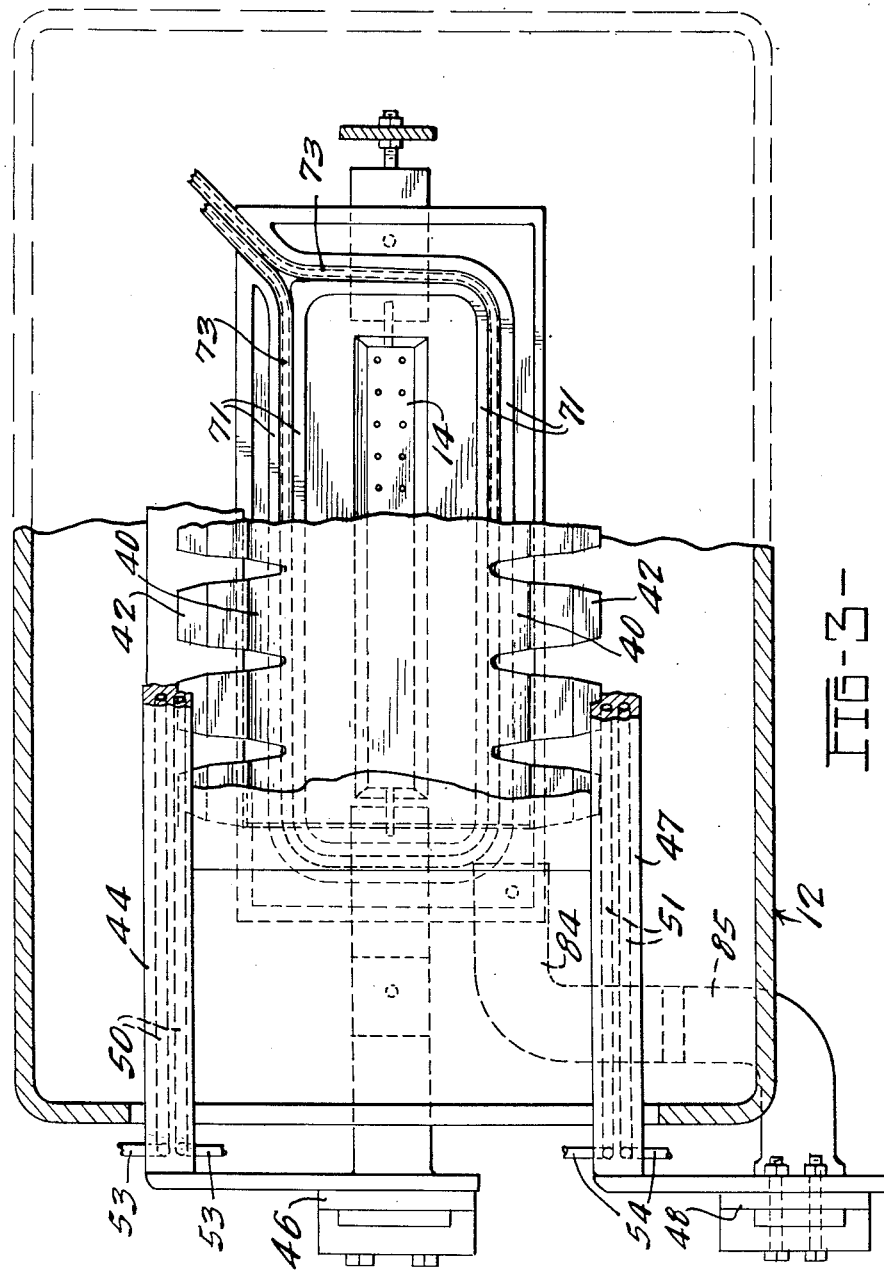

May 28, 1957  R. G. RUSSELL  2,794,058
GLASS FURNACE
Filed Aug. 13, 1952  4 Sheets-Sheet 4
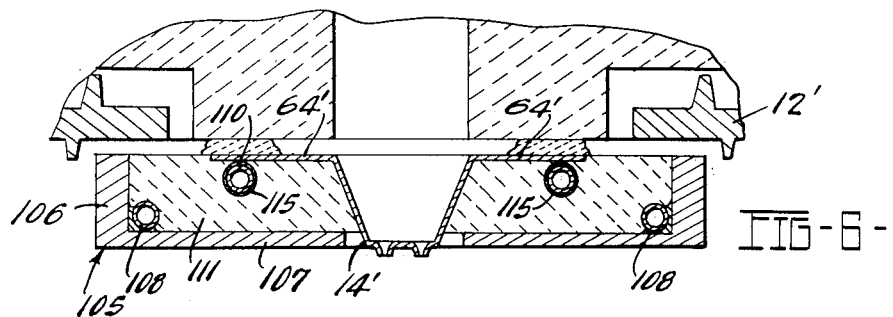
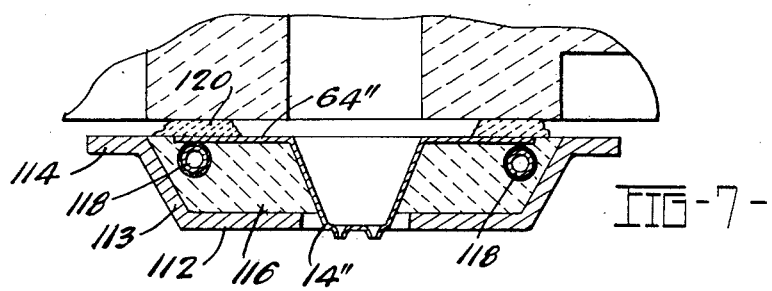
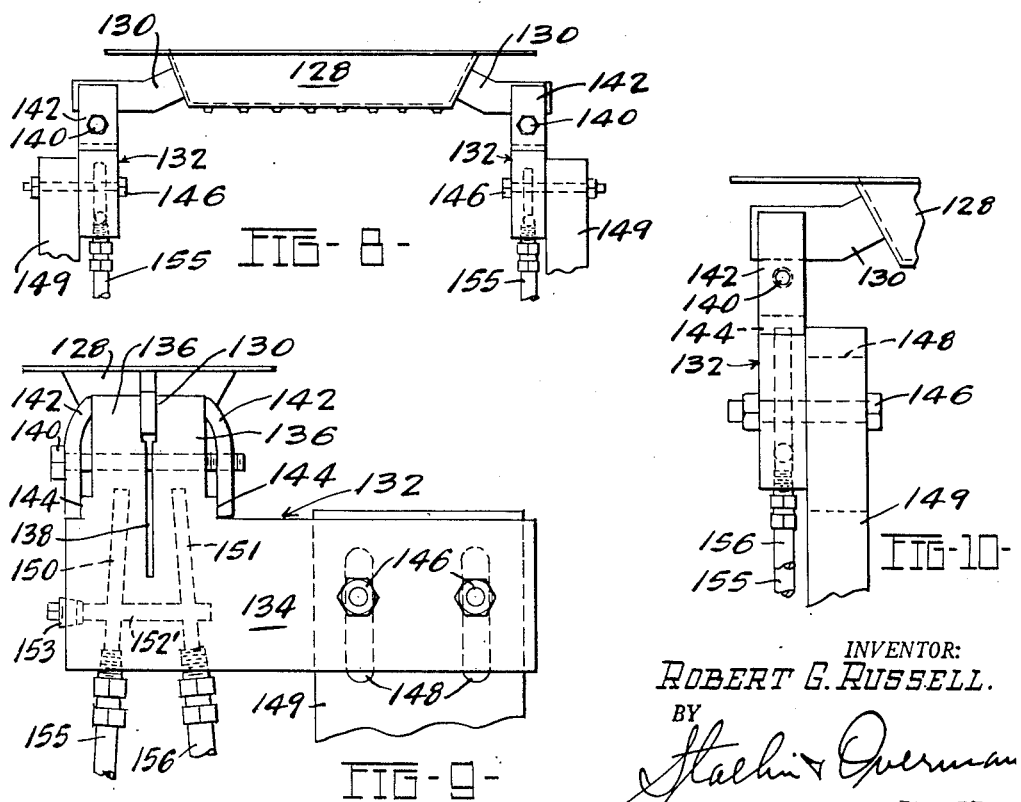
INVENTOR:
ROBERT G. RUSSELL.

United States Patent Office 2,794,058
Patented May 28, 1957

2,794,058

GLASS FURNACE

Robert G. Russell, Granville, Ohio, assignor to Owens-Corning Fiberglas Corporation, a corporation of Delaware Application August 13, 1952, Serial No. 304,140

11 Claims. (Cl. 13—6)

This invention relates to method and apparatus for processing heat-softenable fiber-forming materials and more especially to method and apparatus for heating and controlling the temperature of fiber-forming material to maintain the material in a flowable state for continuously forming a plurality of streams which may be attenuated to fibers.

In the formation of continuous fibers from heat-softenable materials, it has been the practice to flow a plurality of fine streams of material such as glass or other heat-softenable material from a feeding device associated with a material-melting furnace or receptacle, the feeding device being formed with a plurality of orifices or outlets to provide a multiplicity of fine streams of the material. The feeder construction employed is usually fabricated of metal or alloy capable of withstanding the high temperature of glass or other mineral material in molten or flowable condition. Such feeders may be advantageously formed of platinum, rhodium or alloys of a similar character. The metal feeder construction is surrounded by a refractory material, and the assembly of feeder and refractory is supported in a metal frame such, for example, as a frame fashioned of brass.

It has been a practice to pass an electric current through the feeder or bushing in order to maintain the glass or other heat-softenable fiber-forming material in a flowable condition through heat set up by resistance of the feeder to the passage of current. In prior installations a tube surrounds the feeder at its juncture with a refractory support, the tube being adapted to accommodate the circulation of a coolant or cooling fluid for the purpose of congealing the glass at the zone of the tube in order to effect a seal to prevent seepage of the molten glass around the feeder. The refractory support for the feeder is usually carried upon a plate and under the intense heat, the plate tends to warp or become distorted, rendering the structure inoperative until repairs are made.

The invention embraces the provision of a method and apparatus for controlling the temperature of a feeder support or frame in a manner eliminating distortion or warping of the frame.

The invention contemplates the utilization of a metallic supporting frame for a glass feeder or bushing in combination with means for circulating a cooling fluid adjacent certain zones of the frame to maintain the same in a defined relation with respect to a feeder so as to assure continuous, satisfactory operation of the feeder.

An object of the invention resides in the provision of a metallic support for a glass feeder or the like wherein a current of electrical energy is passed through the feeder utilized as a temperature-controlling means and wherein the metallic support for the feeder is utilized as a current-conducting means forming a part of the circuit to the feeder.

Another object of the invention resides in a metallic support for a glass feeder or the like arranged to form a part of an electrical circuit through the feeder and provided with means for controlling the temperature of certain zones of the support for maintaining a relatively fixed relation between the feeder and the support.

Another object is the provision of improved means for connecting a current conductor to a glass feeder in a manner facilitating adjustment of the connecting means relative to the feeder so as to facilitate the adjustment of the current-carrying area established by contact of the connecting means with the feeder.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

Figure 1 is a semidiagrammatic elevational view illustrating a form of apparatus embodying the invention;

Figure 2 is a longitudinal vertical sectional view through the melting tank illustrating the feeder, supporting frame and temperature control therefor;

Figure 3 is a horizontal sectional view taken substantially on the line 3—3 of Figure 2;

Figure 4 is a transverse sectional view of the apparatus shown in Figure 2;

Figure 5 is an enlarged detail sectional view of a portion of the feeder-supporting frame;

Figure 6 is a sectional view illustrating a modified form of the invention;

Figure 7 is a sectional view illustrating another form of the invention;

Figure 8 is a side elevational view partly in section showing a form of current-connecting means for the feeder;

Figure 9 is an end view of one of the current-connecting means, and

Figure 10 is a side view of the construction shown in Figure 9.

The arrangement of feeder and heating apparatus therefor may be utilized for melting various kinds of heat-softenable materials such as glass, and the streams of molten glass or material issuing from the feeder or bushing may be attenuated to fibers by various means. Such attenuation of the streams may be accomplished by winding the fibers drawn from the streams upon a collecting spool or member, by directing the group of fibers between pull rolls rotating at comparatively high speeds, by directing blasts of gases into contact with the streams or by engaging other attenuating forces with the streams.

Referring to the drawings in detail and first with respect to Figure 1, there is diagrammatically illustrated a hopper or other means 10 for supplying fiber-forming material to a melting tank or receptacle 12, the latter being associated with a feeder or bushing 14 provided with a plurality of orifices from which flow streams 16 of molten material from the tank 12. In the embodiment illustrated, the streams 16 are attenuated to fibers by gathering the continuous fibers or filaments by a guide or collector 18 to form a strand which may be collected upon a member or spool 20 adapted to be rotated at a comparatively high speed in order to attenuate the streams.

A suitable valve or material-metering means 22 may be associated with the hopper 10 for regulating and controlling the rate of feed of fiber-forming material into the melting tank 12. As illustrated, the fiber-forming material may be delivered into the hopper in the form of spheres or marbles which are reduced to molten condition within the melting tank 12. The glass or other fiber-forming material may be delivered into the melting tank in the form of raw glass batch in lieu of the marble form. If desired, a lubricant or coating may be applied to the fibers by means of an applicator 24 supplied with coating material from a receptacle 26.

The arrangement includes means for heating the material in the melting tank 12 through the application of an electric current and means for controlling the temperature of a feeder support or frame to minimize or eliminate distortion of the support under the high temperatures existent in and adjacent the material-melting zone.

As shown in Figures 2 and 3, the melting apparatus includes the tank 12 formed with an opening 28 through which the material to be melted may be delivered. The tank 12 may be formed of cast metal such as cast iron, cast steel or the like. The lower portion of the metal tank 12, which contains the molten material, is lined with refractory as shown at 30 within which is disposed a rectangularly shaped body 33 of refractory or heat-resistant material which forms or defines a melting chamber 35.

The chamber 35 may be covered by a ceramic or refractory plate 37 formed with openings 38 through which glass marbles or other fiber-forming material may be introduced into the chamber 35. Suitable means is provided for reducing the glass marbles or other fiber-forming material to a molten or flowable condition through the application of heat, and it has been found that electrical energy is ideally suited for the purpose. To accomplish this purpose, a member or screen 40 of platinum, platinum alloy or other current-conducting material capable of withstanding the high temperatures in the chamber 35 is disposed within the chamber 35.

The member 40 is perforated or slotted to facilitate circulation of the molten material in the chamber 35 about and through the member 40. The member 40 is adapted to form a component of an electric circuit, and the resistance of the member 40 to the passage of current establishes heat sufficient to reduce the fiber-forming material to a molten or flowable state. One end 42 of member 40 is connected by a member 44 with a bus bar 46. The other end of member 40 is connected by a member 47 which is connected with a bar 48, the bars being connected with a source of electric current.

The current-carrying members 44 and 47 are subjected to very high temperatures by reason of their proximity to the chamber 35. Hence, it is desirable to circulate a cooling fluid through tubes or passages 50 and 51 formed in the members 44 and 47. As shown in Figures 2 and 3, the passages 50 and 51 are in communication with tubes 53 and 54 which may be connected to a supply of water, steam, air or other fluid suitable for controlling the temperature of the bars 44 and 47. It should be noted that the member 40 is formed with suitable slots to facilitate movement of the molten fiber-forming material in the melting chamber 35.

Disposed at the perimeter of the tank 12 and interiorly thereof is a tube 55 adapted to contain a coolant or cooling fluid in order to minimize or prevent distortion of the melting tank under the intense heat to which the tank is subjected.

The melting chamber 35 is provided with a floor section 58 of suitable refractory material capable of withstanding the high heat of the molten glass and which is resistant to the corrosive action of glass. The floor section 58 is formed with a longitudinally extending passage or opening 60 through which the molten material flows to a feeder or bushing 14. The feeder 14 is formed of metal such, for example, as a platinum alloy capable of withstanding the heat of the molten glass or other heat-softenable fiber-forming material.

The feeder 14 is of trough-like configuration and is formed at its upper portion with a projecting ledge 64 which is adapted to be supported by a frame or member 65. The feeder 14 is of elongated shape extending contiguously with the passage 60 to receive molten glass from the chamber 35. The lower wall or floor of the feeder 14 is provided with a plurality of orifices or small openings through which the molten material flows in the form of fine streams.

The present arrangement includes the utilization of the feeder as a resistance unit in an electric circuit in order to heat the feeder for maintaining the glass or other molten material in a desired flowable condition. The frame or plate 65 which supports the feeder 14 is also arranged to form a part of the electrical circuit through the feeder 14. The plate 65 is formed with an upwardly extending flange 68 which overlaps a depending flange 69 formed on the tank 12, the molten glass flowing into the space adjacent the flange 68, the glass being caused to congeal by suitable means hereinafter described to form a seal between the member 65 and the floor of the tank 12. The frame 65 is secured to the tank 12 by suitable means (not shown).

Formed on plate 65 is a pair of spaced ridges or projections 71 extending around the central opening accommodating the feeder 14, the ridges bounding a recess in which is disposed a tube or duct 73, the inlet and outlet portions of the tube being in juxtaposed relation at one corner of the plate as illustrated in Figure 3. The tube 73 may be of metal, for example, copper, and is adapted to contain a fluid for circulation therethrough to reduce the temperature of the plate 65 in order to avoid distortion or warping of the plate under the high temperatures existent adjacent the feeder.

The tube may be utilized for the circulation of any suitable fluid such, for example, as water, air, steam or other fluid having satisfactory heat-absorption characteristics for conducting heat away from the plate at a rate which will prevent distortion or warping of the plate. The temperature of the fluid circulating through the duct is lower than the fusing temperature of the glass or other fiber-forming material which causes the glass disposed between the floor of the tank and the plate or frame 65 at the zone of the tube to congeal or freeze and thus establish a seal of solid glass or material between the plate and the floor of the tank. If the seal should be disrupted or broken, molten glass or material from the tank will flow into the rupture immediately, and the reduced temperature in the zone of the tube will cause the glass to congeal and automatically restore the seal.

In addition to the resistance-heating unit 40 for melting the glass batch or other fiber-forming material, it is desirable to effectively control the temperature of the flowable material in the zone of the feeder in order to obtain the flow of streams of uniform size and viscosity through the feeder orifices so that the fibers attenuated from the streams will be of uniform character. Heretofore, it has been a practice to pass an electric current through a feeder by connecting the current-conducting means directly to terminals at the respective ends of the feeder.

In the present arrangement, the plate 65 is utilized as a component or path for the flow of electric current to the feeder. As shown in Figure 2, the feeder 14 is formed with a terminal 75 which is connected to a member 77, the latter being connected to the bus bar 46. The opposite end of the feeder is formed with a terminal 80 which is in direct metallic contact with the plate 65 through the medium of a bolt 81 so as to facilitate the passage of current from the terminal 80 of the feeder direct to the supporting plate 65.

A member 85 is secured to the plate 65 by bolts or other means, the member 85 being connected to the bus bar 48. The position of the feeder 14 may be adjusted with respect to the plate 65. The terminal 75 is equipped with a threaded rod 89 passing through a lug or projection 90 formed on member 77. A pair of lock nuts 91 cooperate with the projection 90 and rod 89 to secure the feeder in a longitudinally adjusted position.

The other terminal 80 of the feeder may likewise be connected with a projection 94 depending from the tank 12, a pair of lock nuts 96 cooperating with the rod 93 and projection 94 for holding the feeder in proper position. The terminal 75 is secured to member 77 by means of a bolt 98. The terminals 75 and 80 are slotted adjacent the bolts 81 and 98 to facilitate longitudinal adjustment of the feeder's position through the manipulation of the pairs of lock nuts 91 and 96.

After adjustment of the feeder has been made, it may be securely locked to member 77 and the plate 65 through the bolts 81 and 98 to obtain good contact for the passage of electric current. The lefthand end of the plate 65 is spaced from the feeder terminal 75 as shown at 100, there being an insulating material such as glass tape disposed between the plate and the terminal at this zone. Disposed between the ledge 64 of the feeder 14 and the plate or support 65 is a strip of insulating material 102 such as glass tape or the like.

The arrangement described above provides a material-melting means and feeder wherein the plate supporting the feeder may be advantageously employed as a current-carrying member and wherein a temperature-reducing means is provided for the plate 65 to eliminate or minimize warpage or distortion thereof by reducing the plate temperature, the temperature-reducing means also forming a congealed body of the fiber-forming material to effect a seal adjacent the perimeter of the feeder.

A modified form of apparatus is illustrated in Figure 6. In this form the melting tank 12' is equipped with a feeder 14' having a laterally extending flange portion 64'. The feeder is supported by means of a plate or frame 105 similar to the plate 65. A modified form of frame-cooling arrangement is provided in this construction. The plate 105 is provided with an upwardly extending portion 106 and a horizontal portion 107. A tube 108 is disposed in the corner or channel formed at the intersection of portions 106 and 107 and extends entirely around the plate and may be brazed or otherwise secured thereto. The tube 108 is connected with a supply of coolant fluid or medium for reducing and controlling the temperature of the zone of the plate 105 adjacent the tube.

A second tube 110 is disposed adjacent the flange 64' of the feeder 14', and is insulated therefrom by a layer or sleeve of cambric 115 formed of glass fibers or the like. The space between the portion 107 of the plate 105 and the flange 64' of the feeder is filled with suitable refractory 111 or other material capable of withstanding high temperatures. A coolant or fluid is circulated through the tube 110 in order to provide a zone adjacent the tube for congealing the fiber-forming material to effect a seal adjacent the flange 64' and prevent the fiber-forming material from escaping along the flange 64' of the feeder. In this arrangement, the tube 108 controls the temperature of the zone of the plate adjacent the tube to reduce the temperature and avoid distortion of the plate, while the fluid in the tube 110 reduces the temperature adjacent the feeder flange 64' to effect a seal of congealed fiber-forming material adjacent the flange.

Another form of construction is illustrated in Figure 7. In this form, the feeder 14" is supported by a frame or plate 112 formed with an upwardly extending wall 113 which terminates in a transversely extending flange 114. Disposed between the flange 64" of the feeder and the plate is a ceramic or refractory material 116. Disposed adjacent both the flange 64" and the wall 113 of the plate 112 is a tube 118 extending around the feeder and adapted to accommodate the circulation of fluid for reducing the temperature adjacent the tube.

Through this arrangement, the reduced temperature established by the fluid in the tube 118 causes the fiber-forming material to congeal or freeze at zone 120 to form a seal and prevent escape of fiber-forming material. The zone of reduced temperature adjacent tube 118 is sufficiently close to the wall 113 of the plate 112 to reduce the temperature of the plate and avoid warpage or distortion of the plate.

In certain installations it is desirable to utilize the feeder bushing as a resistance unit without passing the electric current through the feeder-supporting plate for maintaining the material in a flowable state of a viscosity suitable for discharge through the orifices in the feeder. By varying or changing the zone of contact of the current conductors with the terminals, the heat distribution in the feeder may be changed.

Figures 8, 9 and 10 illustrate a form of connection between the feeder terminals and a current-supply means or bus bar arrangement for effecting regulation and control of the current flowing through the feeder. The feeder 128 is provided near each end with a downwardly extending terminal 130 to which is frictionally clamped a connector construction 132. Each connector consists of a body portion 134 having upwardly extending projections 136 formed by a slot 138 extending into the body portion. The projections 136 are sufficiently resilient to be flexed or drawn into engagement with the terminal 130. A bolt 140 extends through aligned openings in the projection 136. Disposed adjacent each of the projections are clamps or clamping members 142, one end of each member engaging one of the projections 136 while the opposite end of each clamping member engages a ledge 144 formed at the base or juncture of the projections 136 with the body 134 of the connector. The bolt 140 extends through one of the clamps 142 and into a threaded opening in the other of the clamps. The central zones of each clamp are unsupported, facilitating the establishment of clamping pressure through the clamps 142 to the projection 136. The clamps 142 may be formed of hardened steel or other metal which will not readily lost its temper under the extreme heat in the proximity of the feeder so that an effective clamping engagement is continuously maintained between projections 136 and the terminal 130. The connector 132 may be of copper or other suitable current-conducting material having a comparatively low resistance factor. The body 134 of each connector is formed with openings to receive securing bolts 146 which pass through slots 148 formed in a bus bar 149 for securing the connector to the bus bar. The slots 148 afford a vertical adjustment of the connector 132 relative to the bus bar to vary the area of contact between the feeder terminal 130 and the portions 136 of the connector. Thus, by lowering the connector 132 relative to the bus bar 149, the projections 136 have a lesser area of contact with the feeder terminal 130, the reduced area of contact effecting a decrease in the amount of current flowing through the feeder.

The portion of the connector construction adjacent the feeder may be cooled by a circulating fluid. To accomplish this, the body may be bored as at 150 and 151 to provide upwardly extending ducts within the connector which may be joined by a transverse duct 152. The end of the duct 152 may be closed by a plug 153. Fluid inlet and outlet tubes 155 and 156 are provided connected with the ducts 150 and 151 to accommodate the circulation of cooling fluid through the connectors. Any suitable fluid, such as steam, water or air, may be used.

Through this arrangement, the amount of current flowing through the feeder may be regulated and controlled by changing the area of contact of projections 136 with the feeder terminals 130, and in this way the temperature and hence the viscosity of the fiber-forming material within the feeder may be controlled.

The connector arrangement may be utilized in connection with the form of the invention shown in Figures 2 through 5, wherein the one terminal may be formed on an end of the feeder and another terminal formed upon the feeder-supporting plate.

Through the use of the feeder-connector arrangement described above, several of the feeders may be arranged in aligned relation so that any impairment or failure of the operation of the feeders may be instantly detected by the operator.

Through the arrangement of the present invention, an effective and efficient means is provided for controlling the temperature of a feeder-supporting frame which avoids distortion or warping of the plate and at the same time establishes an effective seal between the feeder and the supporting frame to prevent the escape of the molten material from the feeder.

It is apparent that, within the scope of the invention, modifications and different arrangements may be made other than is herein disclosed, and the present disclosure is illustrative merely, the invention comprehending all variations thereof.

What I claim is:

1. Apparatus of the character disclosed, in combination, a feeder formed of metal and provided with a plurality of orifices through which heat-softened material is discharged; a feeder support formed of metal means for directing a current of electricity through the support and the feeder; means for conducting a cooling liquid adjacent the feeder and support, said means being disposed relative to the feeder and support whereby a zone of reduced temperature is established to congeal the material to form a seal and to conduct heat away from the metal support.

2. Apparatus of the character disclosed including, in combination, a feeder formed of metal and provided with a plurality of orifices through which molten material is discharged in a plurality of streams; a supporting frame formed of metal for the feeder; means for directing a current of electricity through said frame and said feeder; a refractory disposed between the feeder and supporting frame, and means extending around the feeder for circulating a cooling fluid adjacent the feeder and supporting frame, said means being disposed relative to the feeder and frame whereby a zone of reduced temperature is established to congeal the molten material to form a seal and concomitantly conduct heat from the supporting frame to avoid distortion of the frame.

3. Apparatus of the character disclosed including, in combination, a feeder formed of metal and provided with orifices through which heated material is discharged; a metallic supporting plate for the feeder; insulating means disposed between said feeder and supporting plate; terminals formed on said feeder and said plate, a metallic connection between said feeder and plate adjacent one end of the feeder, and means for connecting current conductors to said terminals whereby a current of electricity is caused to flow through said feeder and said plate in series relation.

4. Apparatus of the character disclosed including, in combination, a feeder formed of metal and provided with a plurality or orifices through which flowable material is discharged; a supporting frame formed of metal for the feeder; a refractory material disposed between the feeder and the frame; a metallic connection between said feeder and frame adjacent one end of the feeder, terminals formed on said feeder and said frame; means for connecting current conductors to said terminals whereby a current of electric energy is caused to pass through said feeder and said frame in series relation, and means for cooling the frame.

5. Apparatus of the character disclosed including, in combination, a feeder formed with a plurality of orifices through which heated material is discharged; a supporting plate for the feeder; means for causing a current of electricity to pass through said feeder to control the temperature of the material, and means for circulating a cooling fluid adjacent the plate to avoid distortion thereof.

6. A device of the character disclosed including, in combination, a feeder for discharging heated material; a supporting plate for the feeder; nonmetallic means disposed between the feeder and the plate; a metallic connection between said feeder and plate adjacent one end of the feeder, terminals formed respectively on the feeder and plate; means connected to the terminals for conveying a current of electrical energy through the plate and feeder, and means extending substantially around the feeder and adjacent the plate for conducting heat away from the plate for reducing the temperature of the plate.

7. A device of the character disclosed including, in combination, a feeder for discharging heated material; a supporting frame for the feeder; nonmetallic means disposed between the feeder and the plate; a metallic connection between said feeder and plate adjacent an end of the feeder; terminals formed respectively on the feeder and frame; means connected to the terminals for conveying a current of electrical energy through the plate and feeder; and means including a fluid-conducting passage extending substantially around the feeder and adjacent the frame for conducting heat away from the zone adjacent the fluid-conducting passage for reducing the temperature of the plate and for congealing the material at said zone to form a seal.

8. A device of the character disclosed including, in combination, a feeder provided with a plurality of orifices for flowing streams of molten material; means adjacent the feeder for melting the material; a supporting plate for the feeder; nonmetallic means disposed between the feeder and the plate; a metallic connection between said feeder and plate adjacent an end of the feeder; means for conveying a current of electrical energy through the feeder and plate in series relation; a fluid-conducting tube extending substantially around the feeder and adjacent the plate, and means for circulating a fluid through the tube for conducting heat away from the zone adjacent the tube to reduce the temperature of the plate and congeal the material at said zone to form a seal.

9. Apparatus of the character disclosed, in combination, a receptacle for containing fiber-forming material; means for applying heat to the material in the receptacle for reducing the same to a flowable state; a feeder formed of metal associated with the receptacle and having a plurality of orifices through which flow streams of the material from the receptacle; a metal plate supporting the feeder; a refractory disposed between the plate and the feeder; a metallic connection between said feeder and plate adjacent an end of the feeder; a tube arranged in heat-transferring relation with said plate and extending substantially around the feeder, said tube adapted to convey a heat-absorptive fluid for conducting heat away from the plate to avoid distortion of the plate, and means for directing a current of electrical energy through the feeder and plate in series relation for controlling the temperature and viscosity of the material within the feeder.

10. Apparatus of the character disclosed, in combination, a receptacle for containing fiber-forming material; means for applying heat to the material in the receptacle for reducing the same to a flowable state; a feeder associated with the receptacle and having a plurality of orifices through which flow streams of the material from the receptacle; a plate supporting the feeder; a refractory disposed between the plate and the feeder; a tube in engagement with said plate; a second tube disposed adjacent the feeder, said tubes adapted to convey a heat-absorptive fluid for conducting heat away from the plate to avoid distortion of the plate and for establishing a zone of congealed fiber-forming material, and means for directing a current of electrical energy through the feeder for controlling the temperature and viscosity of the material within the feeder.

11. Apparatus of the character disclosed, in combination, a receptacle for containing fiber-forming material; means for applying heat to the material in the receptacle for reducing the same to a flowable state; a feeder formed of metal associated with the receptacle and having a plurality of orifices through which flow streams of the material from the receptacle; a metal plate supporting the feeder; means for directing a current of electrical energy through the feeder and the supporting plate for controlling the temperature of the material in the feeder; a refractory disposed between the plate and the feeder, and a tube in engagement with said plate and extending substantially around the feeder, said tube adapted to convey a heat-absorptive fluid for conducting heat away from the plate to avoid distortion of the plate and established a zone of congealed material surrounding the feeder.

References Cited in the file of this patent

UNITED STATES PATENTS

| | | |
|---|---|---|
| 1,610,377 | Hitner | Dec. 14, 1926 |
| 2,165,318 | Thomas et al. | July 11, 1939 |
| 2,189,822 | Thomas et al. | Feb. 13, 1940 |
| 2,215,982 | Slayter et al. | Sept. 24, 1940 |
| 2,219,346 | Thomas et al. | Oct. 29, 1940 |
| 2,257,767 | Slayter et al. | Oct. 7, 1941 |
| 2,692,296 | De Piolenc et al. | Oct. 19, 1954 |